US010635865B2

(12) United States Patent
Fujimoto et al.

(10) Patent No.: US 10,635,865 B2
(45) Date of Patent: Apr. 28, 2020

(54) CARD INSERTION PART AND CARD READER

(71) Applicant: NIDEC SANKYO CORPORATION, Nagano (JP)

(72) Inventors: Masaya Fujimoto, Nagano (JP); Hiroki Yaginuma, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/285,316

(22) Filed: Feb. 26, 2019

(65) Prior Publication Data

US 2019/0266363 A1 Aug. 29, 2019

(30) Foreign Application Priority Data

Feb. 26, 2018 (JP) ................................ 2018-031666

(51) Int. Cl.
*G06K 7/00* (2006.01)
*G06K 13/08* (2006.01)
*G06K 7/10* (2006.01)

(52) U.S. Cl.
CPC ....... *G06K 7/0078* (2013.01); *G06K 7/10247* (2013.01); *G06K 13/08* (2013.01)

(58) Field of Classification Search
None
See application file for complete search history.

(56) References Cited

U.S. PATENT DOCUMENTS

2017/0132437 A1* 5/2017 Watanabe ............ G06K 7/0013

FOREIGN PATENT DOCUMENTS

JP 2015232822 A 12/2015

* cited by examiner

*Primary Examiner* — Kristy A Haupt
(74) *Attorney, Agent, or Firm* — Cantor Colburn LLP

(57) ABSTRACT

A card insertion part may include a base plate secured to a card reader main body; a substrate that is disposed on an opposite side of the card reader main body with respect to the base plate and including a light source installed on a surface thereof on an opposite side of the base plate; a cover with optical transparency that spreads over the substrate on an opposite side of the base plate; an insulating member that is disposed between the substrate and the base plate; and a flexible wiring member connected to the substrate. The substrate may include an opening through which the card is passed, and a ground wiring pattern formed on an area surrounding the opening. The ground wiring pattern may be electrically connected to the card reader main body via the flexible wiring member.

17 Claims, 3 Drawing Sheets

CARD INSERTION PART AND CARD READER

CROSS REFERENCE TO RELATED APPLICATION

The present application claims priority under 35 U.S.C. § 119 to Japanese Application No. 2018-031666 filed Feb. 26, 2018, the entire content of which is incorporated herein by reference.

BACKGROUND

At least an embodiment of the present invention relates to a card reader and a card insertion part thereof.

A card reader in Japanese Unexamined Patent Application Publication No. 2015-232822 includes: a card insertion part having a card insertion slot formed therein; and a card reader main body that performs a process to, for example, read and write information from and to a card inserted through the card insertion slot. The card insertion part has a configuration such that a cover member with the card insertion slot formed therein has optical transparency and a light source is disposed at the back side of the cover member so that the periphery of the card insertion slot lights up. A substrate with the light source installed thereon is secured to a base plate (reinforcing plate). The card reader main body includes a frame, and the card insertion part is secured to the card reader main body by fixing the base plate to the frame.

In the card reader, when the cover member in the card insertion part is touched by a user's finger that is electrically charged due to static electricity, or the like, the static electricity sometimes jumps to the inner side of the card insertion slot. When static electricity jumps to the inner side of the card insertion slot, the static electricity is applied to the substrate on which the light source is installed. Therefore, there is a possibility of occurrence of improper operation due to static electricity. Furthermore, there is a possibility that electronic components or light sources on a substrate get damaged due to static electricity and the substrate gets damaged.

In Japanese Unexamined Patent Application Publication No. 2015-232822, a metallic base plate is disposed on the back side of the substrate, and the back surface of the substrate is in contact with the base plate. Therefore, the electrical connection between the substrate and the card reader main body via the base plate allows static electricity to be released to the card reader main body via the base plate. Thus, there is a lower possibility of occurrence of improper operations or failures of a substrate due to static electricity.

In a card reader where a substrate with a light source installed thereon is provided in a card insertion part, the number of light sources or the types thereof is sometimes increased for decorations. An increase in the types of light sources installed on a substrate or the number thereof causes complexity of a circuit pattern formed on the substrate. Therefore, in some cases, a circuit pattern is formed on the back side of a substrate, or a through-hole penetrating a substrate is formed. When such a configuration is used, it is preferable that an insulating member is provided between a base plate and a substrate so as to prevent short-circuiting due to the contact between the base plate and a through-hole or a circuit pattern. Insulation between the substrate and the base plate, however, makes it difficult to release static electricity from the base plate and therefore difficult to prevent improper operations or failures due to static electricity.

SUMMARY

In consideration of the above problem, at least an embodiment of the present invention provides a configuration that is less susceptible to effects of static electricity even when an insulating material is disposed between a substrate and a base plate.

To solve the above-described problem, the prevent invention is characterized in a card insertion part having a card insertion slot formed therein to feed a card into a card reader main body and attached to the card reader main body, including a base plate secured to the card reader main body; a substrate that is disposed on an opposite side of the card reader main body with respect to the base plate and that has a light source installed on a surface thereof on an opposite side of the base plate; a cover with optical transparency that spreads over the substrate on an opposite side of the base plate; an insulating member that is disposed between the substrate and the base plate; and a flexible wiring member connected to the substrate, wherein the substrate is provided with an opening through which the card is passed, and a ground wiring pattern formed on an area surrounding the opening, and the ground wiring pattern is electrically connected to the card reader main body via the flexible wiring member.

According to at least an embodiment of the present invention, the cover in the card insertion part has optical transparency, and the substrate with the light source installed thereon is disposed on the inner side of the cover. Therefore, it is possible to make a decoration such that the periphery of the card insertion slot lights up. Furthermore, the insulating member disposed between the substrate with the light source installed thereon and the base plate may prevent the contact between the base plate and a circuit pattern formed on the back surface of the substrate or a through-hole penetrating the substrate. Therefore, complicated circuit patterns may be provided on the substrate. Furthermore, as the substrate includes the ground wiring pattern surrounding the opening through which the card is passed, static electricity jumping onto the card insertion slot may be captured. Moreover, although it is difficult for the substrate to release static electricity through the contact area with the base plate, it includes the flexible wiring member electrically connected to the ground wiring pattern so that operation may be easily performed to electrically connect the ground wiring pattern to the card reader main body. This allows static electricity applies from the card insertion slot to the substrate to be captured and released via the ground wiring pattern and the flexible wiring member, whereby there may be a low possibility of occurrence of improper operations or failures of the substrate due to static electricity and it may be less susceptible to effects of static electricity.

According to at least an embodiment of the present invention, it is preferable that the flexible wiring member is a lead. High flexibility of the lead enables easy operation to place it to the side of the card reader main body. Furthermore, operation to connect to the substrate and operation to connect to the card reader main body are facilitated.

According to at least an embodiment of the present invention, it is preferable that a through-hole electrically connected to the ground wiring pattern is formed on the substrate and one end of the lead is inserted through the through-hole. This structure of inserting the lead through the through-hole enables connection of the lead by the use of the thickness of the substrate. Thus, a small space on the substrate is needed to connect the lead.

According to at least an embodiment of the present invention, it is preferable that the flexible wiring member is fixed to at least any one of the base plate and the card reader main body with the metallic fixing member. This ensures electrical connection between the wiring member and the card reader main body.

According to at least an embodiment of the present invention, it is preferable that the fixing member is also used as the member that fixes the base plate to the card reader main body. Thus, the number of components may be reduced.

According to at least an embodiment of the present invention, it is preferable that the ground wiring pattern includes a zigzag portion in which a plurality of projections protrudes toward the opening and is arranged in a direction along the edge of the opening. Such a pattern shape makes it easy to capture static electricity jumping onto the card insertion slot. Thus, there may be a low possibility of static electricity jumping onto a circuit pattern or electronic component such as a light source on the substrate.

According to at least an embodiment of the present invention, it is preferable the ground wiring pattern surrounds the whole circumference of the opening. This reduces the possibility of escaping static electricity that jumps onto the card insertion slot, whereby there may be a low possibility of static electricity jumping onto a circuit pattern or electronic component such as a light source on the substrate.

Then, at least an embodiment of the present invention is characterized in that the above-described card insertion part and the card reader main body to which the card insertion part is secured are provided. This card reader is capable of capturing static electricity jumping onto the card insertion slot and flowing it to the side of the card reader main body due to the electrical connection between the card reader main body and the substrate of the card insertion part. Thus, it is possible to reduce failures and improper operations of the substrate having the light source installed thereon to light the periphery of the card insertion slot.

According to at least an embodiment of the present invention, the outer surface of the card insertion part may light up so that it is possible to make a decoration such that the periphery of the card insertion slot lights up. Furthermore, the insulating member disposed between the substrate with the light source installed thereon and the base plate may prevent the contact between the base plate and a circuit pattern formed on the back surface of the substrate or a through-hole penetrating the substrate. Therefore, complicated circuit patterns may be provided on the substrate. Furthermore, as the substrate includes the ground wiring pattern surrounding the opening through which the card is passed, static electricity jumping onto the card insertion slot may be captured. Moreover, although it is difficult for the substrate to release static electricity through the contact area with the base plate, it includes the flexible wiring member electrically connected to the ground wiring pattern so that operation may be easily performed to electrically connect the ground wiring pattern to the card reader main body. This allows static electricity applies from the card insertion slot to the substrate to be captured and released via the ground wiring pattern and the flexible wiring member, whereby there may be a low possibility of occurrence of improper operations and failures of the substrate due to static electricity and it may be less susceptible to effects of static electricity.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Overall Configuration

Figure 1:
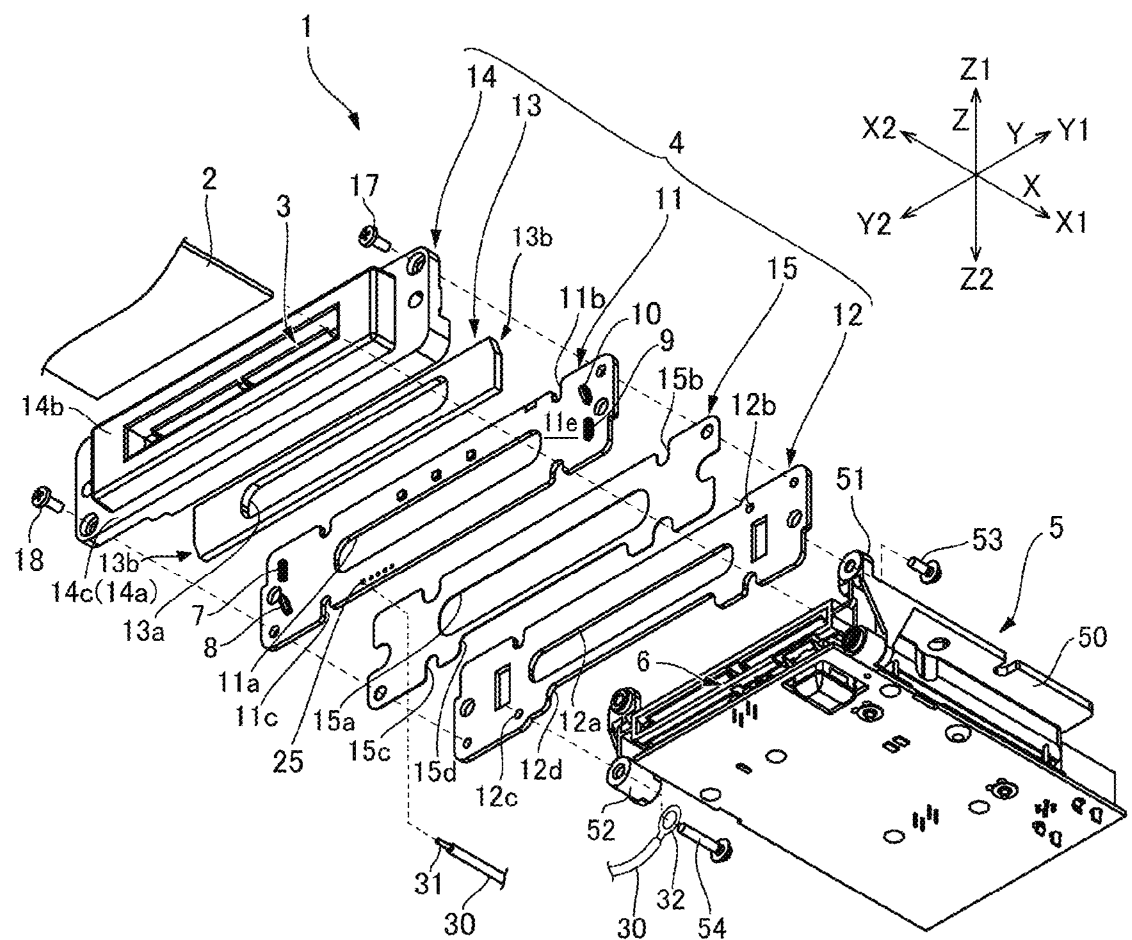
FIG. 1 is an exploded perspective view of the principal part of a card reader to which at least an embodiment of the present invention is applied.

With reference to drawings, an explanation is given below of at least an embodiment of a card reader 1 to which the present invention is applied. FIG. 1 is an exploded perspective view of the principal part of the card reader 1 to which at least an embodiment of the present invention is applied. In this specification, three directions XYZ are directions perpendicular to one another. The X direction is a front-back direction of the card reader 1. A card 2 is inserted into the card reader 1 in an X1 direction and is pulled out from the card reader 1 in an X2 direction. The Y direction is a width direction of the card reader 1; one side of the Y direction is Y1, and the other side is Y2. The Z direction is the height (thickness) direction of the card reader 1; one side of the Z direction is Z1, and the other side is Z2.

The card 2 is, for example, a vinyl chloride card in substantially a rectangular shape with a thickness of approximately 0.7 to 0.8 mm. On the back surface of the card 2, a magnetic stripe (not shown) is formed to record magnetic data. Furthermore, the card 2 has an IC chip built-in and, on the front surface of the card 2, an external connection terminal (not shown) for the IC chip is formed. Only any one of the magnetic stripe and the external connection terminal may be formed on the card 2. Moreover, the card 2 may be a PET (polyethylene terephthalate) card with a thickness of approximately 0.18 to 0.36 mm or may be a paper card, or the like, with a predetermined thickness.

On the front end (the end in the X2 direction) of the card reader 1, a card insertion slot 3 is formed, through which the card 2 is inserted. The card reader 1 includes: a card insertion part 4 provided with the card insertion slot 3; and a card reader main body 5 provided with a card passage 6 connecting to the card insertion slot 3. The card reader main body 5 includes: a magnetic head that reads magnetic data recorded in the magnetic stripe of the card 2 inserted into the card passage 6 and writes magnetic data; an IC contact block that is in contact with the external connection terminal of the IC chip of the card 2 to perform data communications with the card 2; and the like. The card insertion part 4 is attached to the end of the card reader main body 5 in the X2 direction.

The card insertion part 4 includes four light sources 7 to 10; a rigid substrate 11 having the four light sources 7 to 10 installed thereon; and a metallic base plate 12 having the rigid substrate 11 secured thereto. An insulating member 15 is disposed between the rigid substrate 11 and the base plate

12. The card insertion part 4 further includes: a light guiding member 13 formed in a flat-plate like shape; and a cover member 14 having the card insertion slot 3 formed therein. The base plate 12 and the rigid substrate 11 have a substantially rectangular and flat-plate like shape with the direction of its long side in the Y direction. Moreover, the base plate 12 is a metallic plate, and the insulating member 15 is a sheet-like resin member.

The base plate 12 abuts boss portions 51, 52 provided at diagonal positions of a frame 50 of the card reader main body 5 in the X2 direction. The boss portion 51 is provided at the corner of the frame 50 between the Z1 direction and the Y1 direction, and the boss portion 52 is provided at the corner of the frame 50 between the Z2 direction and the Y2 direction. The base plate 12 includes screw holes 12*b*, 12*c* that are formed at the positions overlapped with the boss portions 51, 52 when viewed in the X direction. The ends of metallic screws 53, 54, inserted through the boss portions 51, 52 in the X1 direction, are engaged with the screw holes 12*b*, 12*c* so that the base plate 12 is secured to the frame 50. The insulating member 15 is provided with cutouts 15*b*, 15*c* that are cut-out portions overlapped with the screw holes 12*b*, 12*c* of the base plate 12 when viewed in the X direction. Furthermore, the rigid substrate 11 is provided with cutouts 11*b*, 11*c* that are cut-out at the positions overlapped with the screw holes 12*b*, 12*c* of the base plate 12 and the cutouts 15*b*, 15*c* of the insulating member 15 when viewed in the X direction.

Among the members that constitute the card insertion part 4, the rigid substrate 11 is disposed on the opposite side (X2 direction) of the card reader main body 5 with respect to the base plate 12. The light guiding member 13 is slightly smaller than the rigid substrate 11, and it abuts the rigid substrate 11 in the X2 direction. The cover member 14 is disposed to spread over the rigid substrate 11 and the light guiding member 13 on the opposite side (X2 direction) of the base plate 12.

The cover member 14 and the rigid substrate 11 are secured to the base plate 12 with screws 17, 18 at two diagonal positions. The insulating member 15 is disposed such that it lies between the base plate 12 and the rigid substrate 11 when the cover member 14 and the rigid substrate 11 are fixed with the screws 17, 18, and it is secured to the base plate 12 together with the cover member 14 and the rigid substrate 11. The card insertion part 4 is secured to the card reader main body 5 by fixing the base plate 12 to the frame 50.

The base plate 12, the insulating member 15, the rigid substrate 11, and the light guiding member 13 are provided with openings 12*a*, 15*a*, 11*a*, and 13*a*, respectively, which are through-holes through which the card 2 is passed. Furthermore, the cover member 14 is provided with the card insertion slot 3 through which the card 2 is inserted. The openings 12*a*, 15*a*, 11*a*, and 13*a* are formed in an oval shape whose longitudinal direction is in the Y direction, and they are overlapped with the card insertion slot 3 in the X direction. The openings 12*a*, 15*a*, 11*a*, and 13*a* constitute a card insertion passage through which the card 2 is passed.

The light guiding member 13 is shaped like a substantially rectangular flat plate with the direction of its long side in a horizontal direction, and it is disposed such that the thickness direction of the light guiding member 13 coincides with the X direction that is the front-back direction of the card reader 1. The light guiding member 13 is smaller than the rigid substrate 11 in width in the Y direction and in height in the Z direction. The light guiding member 13 is formed like a frame with substantially a rectangular shape, and it surrounds the whole circumference of the card insertion slot 3 when viewed in the X direction. Chamfered portions 13*b* are formed at two corners of the light guiding member 13 in a diagonal direction.

The light sources 7 to 10 are LEDs (light emitting diodes), and they are installed on a front surface 11 e of the rigid substrate 11. A drive control circuit for the light sources 7 to 10 is installed on the rigid substrate 11. The light guiding member 13 is in contact with the front surface 11*e* of the rigid substrate 11. The light sources 7, 8 are disposed in the Y2 direction of the light guiding member 13 abutting the rigid substrate 11, and the light sources 9, 10 are disposed in the Y1 direction of the light guiding member 13. Furthermore, the light sources 7 to 10 are provided at the same position as the light guiding member 13 in the X direction, and they emit light toward edge surfaces of the light guiding member 13. The light sources 7, 9 are provided such that the emission surfaces of the light sources are opposed to the edge surface of the light guiding member 13 in the Y2 direction and the edge surface thereof in the Y1 direction. Furthermore, the light sources 8, 10 are provided such that the emission surfaces of the light sources are opposed to the chamfered portions 13*b* of the light guiding member 13. The light sources 7 to 10 are in contact with edge surfaces of the light guiding member 13.

The front surface 11*e* of the rigid substrate 11 that is in contact with the light guiding member 13 is white, and the front surface 11*e* is a reflective surface that reflects light in the X2 direction, the light entering from the light guiding member 13 in the X1 direction. Here, the front surface 11*e* may be any reflective surface that reflects light, and the color of the front surface 11*e* may be a color other than white color.

The cover member 14 is formed of a resin material. Furthermore, the cover member 14 is formed of a translucent material with optical transparency. According to the present embodiment, the cover member 14 is formed of an opaque white material with optical transparency. Furthermore, the cover member 14 may be formed of a translucent material with optical transparency in a color such as gray other than opaque white. The cover member 14 includes: a base portion 14*a* formed like a flat plate and a substantially rectangular frame; and a projection portion 14*b* protruding from the base portion 14*a* in the X2 direction. The projection portion 14*b* is cylindrical with substantially a square shape elongated in the Y direction with the direction of its axis in the X direction, and the inner circumference side of the projection portion 14*b* is the card insertion slot 3. Furthermore, the projection portion 14*b* protrudes from the center of the base portion 14*a* in the X2 direction, and a front surface 14*c* of the base portion 14*a* is formed like a frame with substantially a rectangular shape, surrounding the whole circumference of the projection portion 14*b*.

The cover member 14 is secured to the base plate 12 with the screws 17, 18 together with the rigid substrate 11 and the insulating member 15. Furthermore, the cover member 14 covers the light sources 7 to 10, the rigid substrate 11, and the light guiding member 13 in the X2 direction. According to the present embodiment, the front surface 14*c* of the base portion 14*a* is an attachment surface for a game machine in which the card reader 1 is installed. When the card reader 1 is attached to the game machine, only the projection portion 14*b* is exposed on the front panel of the game machine. Furthermore, when the card reader 1 is attached to the game machine, the front surface 14*c* of the base portion 14*a* is covered with a light shielding member.

According to the present embodiment, the width of the projection portion 14*b* in a horizontal direction is smaller than the width of the light guiding member 13 in a horizontal direction. As the light sources 7 to 10 are disposed on both sides of the light guiding member 13 in the Y direction, they are disposed outside of the projection portion 14*b* in the Y direction. That is, according to the present embodiment, when viewed in the X2 direction, the light sources 7 to 10 are provided at positions that are not overlapped with the exposed portion (i.e., the projection portion 14*b*) of the card insertion part 4 on the front panel of the game machine.

The card reader 1 according to the present embodiment is installed in, but are not limited to, a game machine placed at a casino, a game arcade, or the like, and the card reader 1 is used while the card 2 is inserted into the card reader 1. Furthermore, when the card 2 is inserted into the card reader 1, the light sources 7 to 10 emit light toward the light guiding member 13 so that the portion of the card insertion part 4 around the card insertion slot 3 lights up.

Ground Wiring Pattern

Figure 2A:
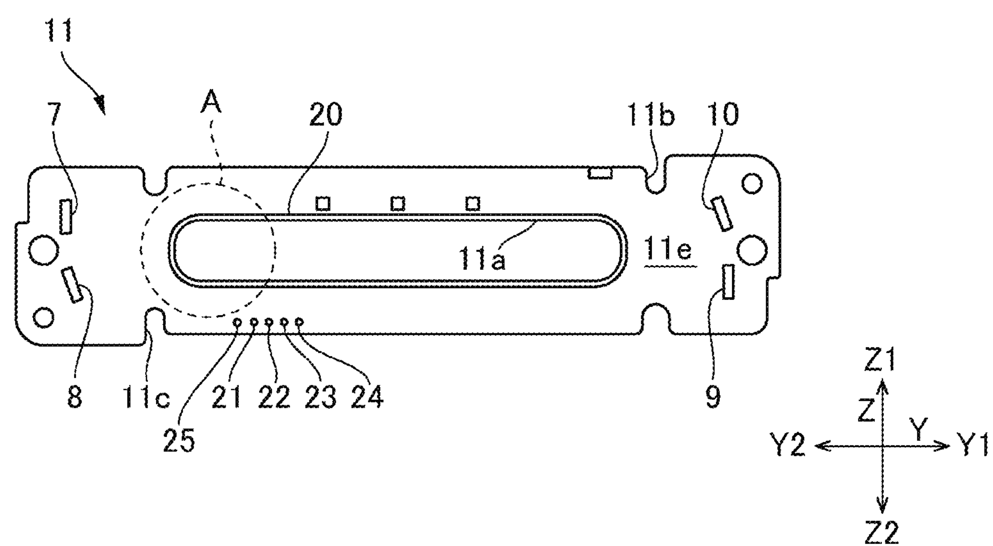
FIG. 2A and FIG. 2B are a plan view of a substrate provided on a card insertion part and a partially enlarged view of a ground wiring pattern.
Figure 2B:
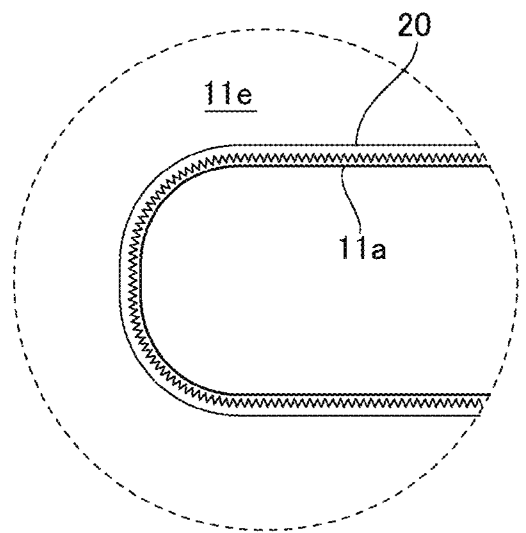

FIG. 2A and FIG. 2B area plan view of the rigid substrate 11 and a partially enlarged view of a ground wiring pattern 20. FIG. 2A is a plan view of the rigid substrate 11 when viewed in the X2 direction. Furthermore, FIG. 2B is a partially enlarged view of an area A in FIG. 2A. As for the rigid substrate 11, as the light sources 7 to 10 are provided on the front surface 11*e*, which is the substrate surface facing in the X2 direction, the front surface 11*e* is provided with an undepicted circuit pattern (hereafter, referred to as the circuit pattern for LEDs) that forms the drive control circuit for the light sources 7 to 10. Furthermore, the front surface 11 e is provided with the ground wiring pattern 20 on the area surrounding the opening 11*a* forming the card insertion passage. According to the present embodiment, as the ground wiring pattern 20, an oval pattern surrounding the whole circumference of the opening 11*a* is formed. The ground wiring pattern 20 according to the present embodiment is a conductive pattern formed by solder plating over copper foil.

As shown in FIG. 2B, the ground wiring pattern 20 is a zigzag pattern in which a plurality of projections protrudes toward the opening 11*a* and is arranged in a direction along the edge of the opening. The ground wiring pattern 20 is formed on an area near the opening 11*a*. According to the present embodiment, the ground wiring pattern 20 is formed at a position from the opening 11*a* in a distance of approximately 0.5 mm to 0.7 mm. Although it is preferable that the ground wiring pattern 20 is a pattern surrounding the whole circumference of the opening 11*a*, it may be formed on an area surrounding at least part of the opening 11*a*.

As shown in FIG. 2B, the rigid substrate 11 is provided with through-holes 21 to 25 at five points along the outer circumference edge in the Z2 direction. The through-hole 25 is electrically connected to the ground wiring pattern 20 with an undepicted wire pattern formed on the rigid substrate 11. The ground wiring pattern 20 and the through-hole 25 are insulated from the light sources 7 to 10 provided on the rigid substrate 11. That is, the circuit pattern for LEDs on the rigid substrate 11 and the ground wiring pattern 20 are insulated from each other.

The through-holes 21 to 24 at four points are connected to the circuit pattern for LEDs. The through-holes 21 to 24 are connected to three signal lines for feeding signals for control to the circuit pattern for LEDs and to a lead for power supply. Furthermore, the position or the number of the through-holes is changeable as needed in accordance with wiring or a circuit pattern to be connected.

As shown in FIG. 1, the base plate 12 is provided with a cutout 12*d* that is a portion at the edge in the Z2 direction and at the center in the Y direction being cut-out in the Z1 direction. The cutout 12*d* is formed on an area overlapped with the through-holes 21 to 24 of the rigid substrate 11 when viewed in the X direction. Also, the insulating member 15 is provided with a cutout 15*d* by cutting out a portion at the edge in the Z2 direction and at the center in the Y direction. The cutout 15*d* is overlapped with the cutout 12*d* of the base plate 12. Therefore, when the rigid substrate 11 is secured to the base plate 12, the through-holes 21 to 24 are not covered with the insulating member 15 or the base plate 12, and they are exposed on the inner side of the cutout 12*d* of the base plate 12. Thus, the three signal lines for LEDs and the lead for power supply are connectable to the card reader main body 5 via the cutout 12*d* and the cutout 15*d*.

Lead

The card insertion part 4 includes a lead 30 that is a flexible wiring member connected to the rigid substrate 11. The lead 30 is a member that electrically connects the ground wiring pattern 20 formed on the rigid substrate 11 to the card reader main body 5. As shown in FIG. 1, the lead 30 has a core 31 exposed at one end side, and the core 31 is inserted through the through-hole 25 and is soldered so as to be connected to the rigid substrate 11.

Figure 3:
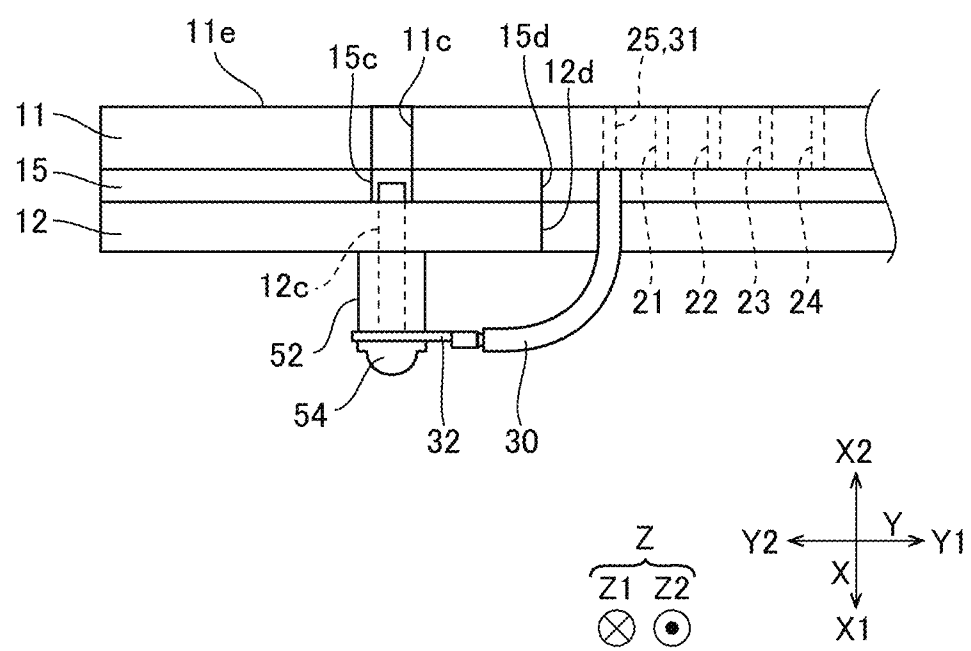
FIG. 3 is an explanatory diagram that schematically shows the connection structure of a lead.

FIG. 3 is an explanatory diagram that schematically shows the connection structure of the lead 30, and it is a partial plan view of the ends of the base plate 12, the insulating member 15, and the rigid substrate 11 in the Y2 direction when viewed in the Z2 direction. As shown in FIG. 1 and FIG. 3, a crimping terminal 32 provided on the other end of the lead 30 is secured to the frame 50 of the card reader main body 5 together with the base plate 12 with one of the two screws 53, 54 for fixing the base plate 12 to the frame 50. According to the present embodiment, the screw 54 for fixing the corners of the frame 50 and the base plate 12 between the Z2 direction and the Y2 direction is inserted through the crimping terminal 32 and the boss portion 52 and is fastened to the base plate 12. In this manner, the other end of the lead 30 is fixed to the frame 50 and the base plate 12. As shown in FIG. 3, as the crimping terminal 32 is sandwiched between the head of the screw 54 and the edge surface of the boss portion 52, the lead 30 is electrically connected to the frame 50 and the screw 54. Furthermore, as the frame 50 abuts the base plate 12 and the screw 54 is fastened to the base plate 12, the lead 30 and the base plate 12 are electrically connected to each other via the frame 50 and the screw 54. Although the signal lines for LEDs and the lead for power supply are not shown in FIG. 3, the lead 30 is connected to the frame 50 via the cutout 12*d* and the cutout 15*b* in the same manner as the signal lines for LEDs and the lead for power supply.

The frame 50 of the card reader main body 5 is grounded, and the frame ground potential is set. Therefore, by electrically connecting the frame 50 and the ground wiring pattern 20 with the lead 30, static electricity captured by the ground wiring pattern 20 may be released to the frame 50. In the card insertion part 4, when the card 2 is inserted into the card insertion slot 3, static electricity sometimes jumps from an electrically charged finger to the card insertion slot 3. According to the present embodiment, as the ground wiring pattern 20 is formed so as to surround the opening 11*a* of the rigid substrate 11, the static electricity may be captured by the ground wiring pattern 20 and released to the frame 50, whereby failures and improper operations of the light sources 7 to 10 and the circuit pattern for LEDs due to static electricity may be reduced. Furthermore, failures and improper operations of a control board, various types of circuits, and the like, in the card reader main body 5 due to static electricity may be reduced.

Primary Advantage of the Present Embodiment

As described above, in the card reader 1 according to the present embodiment, the cover member 14 of the card insertion part 4 has optical transparency, and the rigid substrate 11 with the light sources 7 to 10 installed thereon is disposed on the inner side of the cover member 14. Thus, it is possible to make a decoration such that the periphery of the card insertion slot 3 lights up. Furthermore, the insulating member 15 disposed between the rigid substrate 11 with the light sources 7 to 10 installed thereon and the base plate 12 may prevent the contact between the base plate 12 and a circuit pattern formed on the substrate surface of the rigid substrate 11 in the X1 direction or a through-hole penetrating the rigid substrate 11. Thus, complicated circuit patterns may be provided on the rigid substrate 11. Furthermore, as the rigid substrate 11 includes the ground wiring pattern 20 surrounding the opening 11*a* through which the card 2 is passed, static electricity jumping onto the card insertion slot 3 may be captured. Moreover, although the rigid substrate 11 is not in contact with the base plate 12, it includes the lead 30 electrically connected to the ground wiring pattern 20, and therefore operation may be easily performed to electrically connect the ground wiring pattern 20 to the card reader main body 5. This allows static electricity applied from the card insertion slot 3 to the rigid substrate 11 to be captured and released via the ground wiring pattern 20 and the lead 30. Thus, there may be a lower possibility of the occurrence of failures and improper operations of the light sources 7 to 10 on the rigid substrate 11 and their drive control circuit due to static electricity.

In the card insertion part 4 according to the present embodiment, the through-hole 25 is formed on the rigid substrate 11, and one end of the lead 30 is inserted through the through-hole 25 and secured to the rigid substrate 11. High flexibility of the lead 30 facilitates operation to place and connect it to the side of the card reader main body 5. Furthermore, insertion of the lead 30 through the through-hole 25 and soldering enable connection of the lead 30 by the use of the thickness of the rigid substrate 11. Thus, a small space on the rigid substrate 11 is needed to connect the lead 30.

According to the present embodiment, the other end of the lead 30 is fixed to the base plate 12 and the frame 50 with the metallic screw 54. Specifically, the crimping terminal 32 of the lead 30 is nipped and fastened between the head of the screw 54 and the boss portion 52 of the frame 50. This ensures the electrical connection between the crimping terminal 32 and the frame 50 of the card reader main body 5 and the electrical connection between the ground wiring pattern 20 and the frame 50. Furthermore, the member for establishing electrical connection and the fixing member may be combined for use. Furthermore, the screw 54 is also used as a fixing member for fixing the base plate 12 to the frame 50. Thus, the number of components may be reduced.

According to the present embodiment, the ground wiring pattern 20 formed on the rigid substrate 11 is a zigzag pattern in which a plurality of projections protrudes toward the opening 11*a* and is arranged in a direction along the edge of the opening 11*a*. This kind of pattern makes it easier to capture static electricity jumping onto the card insertion slot 3. Furthermore, as the ground wiring pattern 20 surrounds the whole circumference of the opening 11*a*, there is a lower possibility of escaping static electricity. Thus, there may be a lower possibility of static electricity jumping onto a circuit pattern or electronic component on the rigid substrate 11.

Modification (1) Although the above-described embodiment has the structure for fixing the crimping terminal 32 of the lead 30 to the frame 50 with the screw 54 that fixes the base plate 12 to the frame 50, it may have a structure for directly fastening the crimping terminal 32 to the base plate 12 with a screw. In this case, the frame 50 and the crimping terminal 32 may be electrically connected together via the base plate 12 and the screws 53, 54.

(2) Although the above-described embodiment has the structure for connecting the lead 30 to the rigid substrate 11 by the use of the through-hole 25, the core 31 of the lead 30 may be soldered on the substrate surface of the rigid substrate 11.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card insertion part having a card insertion slot formed therein to feed a card into a card reader main body and attached to the card reader main body, the card insertion part comprising:

a base plate secured to the card reader main body;

a substrate that is disposed on an opposite side of the card reader main body with respect to the base plate and comprising a light source installed on a surface thereof on an opposite side of the base plate;

a cover with optical transparency that spreads over the substrate on an opposite side of the base plate;

an insulating member that is disposed between the substrate and the base plate; and a flexible wiring member connected to the substrate, wherein the substrate comprises an opening through which the card is passed, and a ground wiring pattern formed on an area surrounding the opening, and the ground wiring pattern is electrically connected to the card reader main body via the flexible wiring member.

2. The card insertion part according to claim 1, wherein the flexible wiring member is a lead.

3. The card insertion part according to claim 2, wherein the substrate comprises a through-hole electrically connected to the ground wiring pattern, and one end of the lead is inserted through the through-hole.

4. The card insertion part according to claim 3, wherein the flexible wiring member is secured to at least any one of the base plate and the card reader main body with a metallic fixing member.

5. The card insertion part according to claim 4, wherein the fixing member is also used as a member for securing the base plate to the card reader main body.

6. The card insertion part according to claim 5, wherein the ground wiring pattern comprises a zigzag portion in which a plurality of projections protrudes toward the opening and is arranged in a direction along an edge of the opening.

7. The card insertion part according to claim 6, wherein the ground wiring pattern surrounds a whole circumference of the opening.

8. A card reader comprising:

the card insertion part according to claim 7; and a card reader main body to which the card insertion part is secured.

9. The card insertion part according to claim 3, wherein the ground wiring pattern comprises a zigzag portion in which a plurality of projections protrudes toward the opening and is arranged in a direction along an edge of the opening.

10. The card insertion part according to claim 9, wherein the ground wiring pattern surrounds a whole circumference of the opening.

11. The card insertion part according to claim 1, wherein the flexible wiring member is secured to at least any one of the base plate and the card reader main body with a metallic fixing member.

12. The card insertion part according to claim 11, wherein the fixing member is also used as a member for securing the base plate to the card reader main body.

13. The card insertion part according to claim 12, wherein the ground wiring pattern comprises a zigzag portion in which a plurality of projections protrudes toward the opening and is arranged in a direction along an edge of the opening.

14. The card insertion part according to claim 13, wherein the ground wiring pattern surrounds a whole circumference of the opening.

15. The card insertion part according to claim 1, wherein the ground wiring pattern comprises a zigzag portion in which a plurality of projections protrudes toward the opening and is arranged in a direction along an edge of the opening.

16. The card insertion part according to claim 15, wherein the ground wiring pattern surrounds a whole circumference of the opening.

17. A card reader comprising:

the card insertion part according to claim 1; and a card reader main body to which the card insertion part is secured.

* * * * *